United States Patent
Webb et al.

(10) Patent No.: US 9,741,028 B2
(45) Date of Patent: Aug. 22, 2017

(54) SYSTEM AND METHOD FOR TRANSACTION PAYMENTS USING A MOBILE DEVICE

(75) Inventors: Tim Webb, Rogers, AR (US); Jason Todd, Lowell, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 10 days.

(21) Appl. No.: 13/046,525

(22) Filed: Mar. 11, 2011

(65) Prior Publication Data

US 2011/0225057 A1    Sep. 15, 2011

Related U.S. Application Data

(60) Provisional application No. 61/312,837, filed on Mar. 11, 2010.

(51) Int. Cl.
| | |
|---|---|
| G06Q 20/20 | (2012.01) |
| G06Q 30/06 | (2012.01) |
| G06Q 20/32 | (2012.01) |
| G06Q 20/40 | (2012.01) |
| G06Q 40/02 | (2012.01) |
| G06F 19/20 | (2011.01) |

(52) U.S. Cl.
CPC ............ *G06Q 20/32* (2013.01); *G06Q 20/20* (2013.01); *G06Q 20/327* (2013.01); *G06Q 20/40* (2013.01); *G06Q 30/06* (2013.01); *G06Q 40/02* (2013.01)

(58) Field of Classification Search
USPC ........... 705/79, 42, 44, 17, 16; 235/375, 379
See application file for complete search history.

(56) References Cited

U.S. PATENT DOCUMENTS

| | | | |
|---|---|---|---|
| 7,146,325 B2 | 12/2006 | Yamakawa et al. | |
| 7,434,723 B1* | 10/2008 | White | G06Q 20/20 235/375 |
| 7,635,084 B2* | 12/2009 | Wang | G06Q 20/00 235/375 |
| 2002/0103707 A1 | 8/2002 | Takeuchi et al. | |
| 2002/0169674 A1 | 11/2002 | Nohara et al. | |
| 2002/0181710 A1* | 12/2002 | Adam | G06Q 20/02 380/270 |

(Continued)

FOREIGN PATENT DOCUMENTS

| | | |
|---|---|---|
| CN | 1549575 A | 11/2004 |
| CN | 101647040 A | 2/2010 |

(Continued)

OTHER PUBLICATIONS

Office Action issued in corresponding Japanese Application No. 2012-557292 mailed Oct. 13, 2015.

(Continued)

*Primary Examiner* — Scott Zare
*Assistant Examiner* — Reva R Danzig
(74) *Attorney, Agent, or Firm* — McCarter & English, LLP; David R. Burns (57) ABSTRACT

A system and method for performing a financial transaction may include processing a purchase transaction for products for purchase by a customer to determine a transaction amount. A communication with a mobile device of the customer may include communicating a store identifier, POS identifier, and the transaction amount. In response to receiving an approval number for the purchase transaction from a financial institution of the customer, completing the purchase transaction for the purchase of the products by the customer.

20 Claims, 5 Drawing Sheets

(56) References Cited

U.S. PATENT DOCUMENTS

| | | | |
|---|---|---|---|
| 2007/0089168 A1* | 4/2007 | Wang | G06Q 20/00 726/9 |
| 2008/0208762 A1* | 8/2008 | Arthur | G06Q 20/027 705/79 |
| 2009/0094126 A1* | 4/2009 | Killian | G06Q 20/0855 705/17 |
| 2009/0164371 A1* | 6/2009 | Arroyo | G06Q 20/0655 705/42 |
| 2009/0177581 A1* | 7/2009 | Garcia | G06Q 20/16 705/44 |
| 2009/0281904 A1* | 11/2009 | Pharris | G06Q 20/102 705/17 |
| 2009/0310546 A1* | 12/2009 | Gopinath | H04W 48/04 370/329 |

FOREIGN PATENT DOCUMENTS

| | | |
|---|---|---|
| JP | 2002-109216 A | 4/2002 |
| JP | 2002-230648 A | 8/2002 |
| JP | 2002-251435 A | 9/2002 |
| JP | 2002-318894 A | 10/2002 |
| JP | 2002-542530 A | 12/2002 |
| JP | 2004-171276 A | 6/2004 |
| JP | 2004-199269 A | 7/2004 |
| WO | 0049551 A1 | 8/2000 |

OTHER PUBLICATIONS

Office Action issued in corresponding Japanese patent application No. 2016-021687 dated Jan. 10, 2017.

Office Action issued in corresponding Chinese Application No. 201180019499.5 dated Apr. 3, 2015.

Office Action issued in corresponding Japanese Application No. 2012-557292 mailed Jan. 19, 2015.

International Search Report and Written Opinion date mailed May 12, 2011 for PCT Application No. PCT/US2011/028187.

* cited by examiner

FIG. 8B

SYSTEM AND METHOD FOR TRANSACTION PAYMENTS USING A MOBILE DEVICE

RELATED APPLICATIONS

This Application claims priority from U.S. Provisional Patent Application Ser. No. 61/312,837 filed on Mar. 11, 2010, the entire contents of which are incorporated herein by reference in their entirety.

BACKGROUND

Payment for goods and services is generally performed using cash, checks, credit cards, prepaid cards, and debit cards. The use of credit cards, prepaid cards, and debit cards ("payment cards") allows buyers not to carry cash to pay for goods and services.

Current payment card payment systems in a merchant environment require a buyer to use his or her payment card at a point-of-sale ("POS"), such as a cash register, to purchase goods or services. The POS reads payment information (e.g., account number) from the payment card via a magnetic strip or another memory device integrated into the payment card, as understood in the art. In response, the POS communicates the payment information to an epay system, which, in turn, routes the payment information to a financial routing system. The financial routing system determines with which financial program (e.g., Visa, MasterCard, American Express) and institution (e.g., Citibank, Bank of America, etc.) the payment information is associated and routes the payment information to the financial program and/or institution for processing.

As technology has advanced rapidly, especially in the field of telecommunications, payment systems have attempted to leverage from the technological advancement of telecommunications to enable mobile devices to be integrated into financial transaction processes. Traditional mobile device financial transaction processes require a mobile device to wirelessly communicate payment information, including an account number and other relevant information (e.g., expiration date and name), to a cash register. The cash register in turn, communicates the payment information to the epay system, financial routing system, financial program, and financial institution to receive approval for the financial transaction, as previously described. The incorporation of the mobile device into the financial transaction process, however, merely eliminates the need for the consumer to carry a payment card. However, as one would expect, a problem of wirelessly communicating financial information in a retail environment includes potential interception of account information. As a result, consumers and retailers have been resistant to adopting mobile device financial transaction processes.

SUMMARY

Mobile device financial transaction processes or payment systems may be utilized in a manner that avoids the problems of existing mobile device payment systems by not having an account number or other financial information stored on a mobile device or communicated within a retail store environment. In accordance with the principles of the present invention, payment at a POS using a mobile device may include communicating a store identifier, POS identifier, and transaction amount from the POS to a mobile device of a customer. The mobile device, in response, may communicate the store identifier, POS identifier, and transaction amount to a communications service provider of the customer. The communications service provider in turn, may communicate the store identifier, POS identifier, and transaction amount, along with a customer identifier, to a financial institution and/or program. The financial institution may associate the customer identifier with an account identifier to perform an approval process for the financial transaction. The financial institution may communicate an approval identifier or rejection notification to the communications service provider, which, in turn, may route the approval identifier via an epay system for communication to the POS to authorize the transaction.

One embodiment of a point-of-sale (POS) for performing financial transactions may include a processing unit configured to enable processing of a purchase transaction for products for purchase for a customer to determine a transaction amount. The POS may further include a wireless interface in communication with the processing unit. The processing unit may be configured to enable the processing unit to communicate with a mobile device being utilized by the customer. The processing unit may further be configured to communicate a store identifier, POS identifier, and the transaction amount to the mobile device. In response to receiving an approval number from a financial institution of the customer, the processor may complete the purchase transaction.

One embodiment of a method for performing a financial transaction may include processing a purchase transaction for products for purchase by a customer to determine a transaction amount. A communication with a mobile device of the customer may include communicating a store identifier, POS identifier, and the transaction amount. In response to receiving an approval number for the purchase transaction from a financial institution of the customer, completing the purchase transaction for the purchase of the products by the customer.

One embodiment of a method for performing a financial transaction in a retail store may include determining a transaction amount for a purchase of at least one product by a customer. A wireless interaction with a mobile device of the customer may be performed. The purchase for the at least one product may be completed in response to receiving an approval number from a financial institution of the customer in response to wirelessly interacting with the mobile device without communicating an account number associated with the customer established by the financial institution for performing a financial transaction.

One embodiment of a system for processing financial transactions of a subscriber of a mobile device when purchasing products may include a storage unit configured to store a data repository including mobile device identifiers associated with mobile devices of subscribers and customer identifiers associated with respective mobile device identifiers. An input/output (I/O) unit may be configured to communicate data over at least one communications network. A processing unit may be in communication with the storage unit and I/O unit, and, in response to receiving a communication from a mobile device of a subscriber that includes a POS identifier and transaction balance, be configured to look-up a customer identifier associated with a mobile device identifier of the mobile device and communicate the customer identifier to a financial institution of the subscriber for approval of a financial transaction being performed by a POS.

One embodiment of a method for approving a financial transaction may include receiving, from a communications service provider, a communication that includes a customer identification and transaction amount associated from a transaction being performed by a customer at a point-of-sale. In response to receiving the communication, the customer identifier may be associated with an account of the customer. A determination as to whether to authorize the transaction for the customer based on an account balance of the account may be made. An authorization notification may be communicated to the point-of-sale in response to determine that the transaction is authorized. The authorization notification may include an authorization identifier. Otherwise, a denial notification may be communicated to the point-of-sale in response to determining that the transaction is not authorized.

BRIEF DESCRIPTION

Illustrative embodiments of the present invention are described in detail below with reference to the attached drawing figures, which are incorporated by reference herein and wherein.

DETAILED DESCRIPTION

Figure 1:
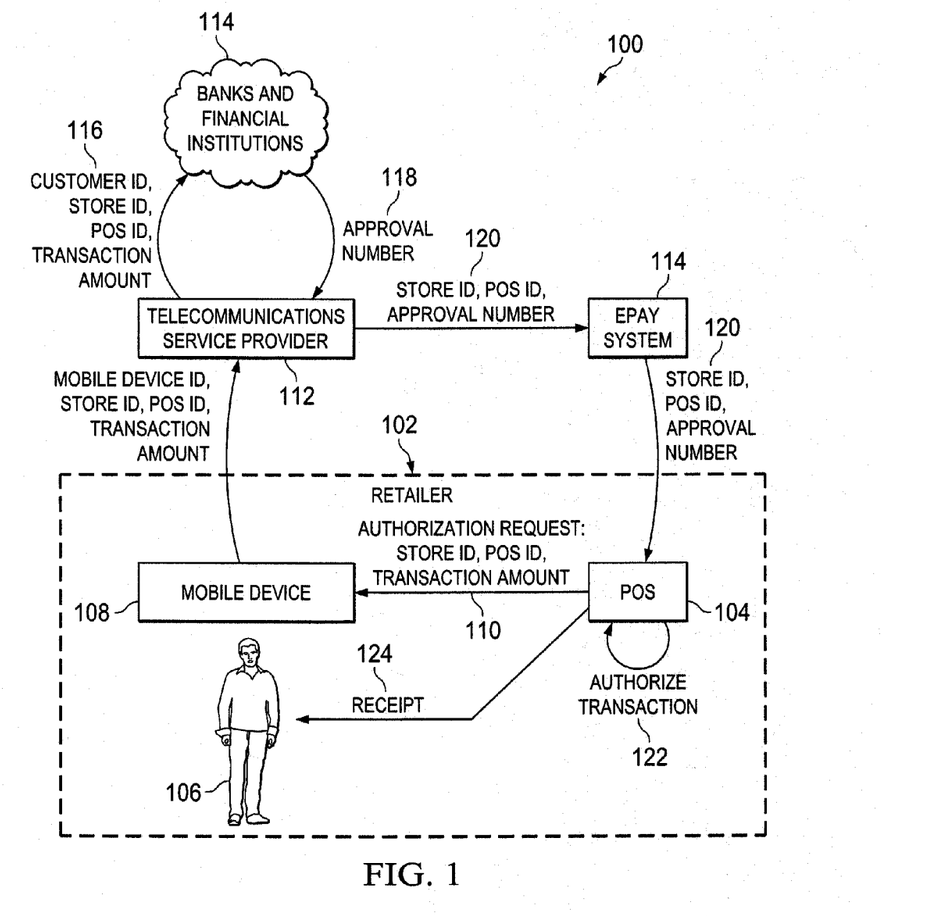
FIG. 1 is an illustration of an illustrative network environment in which a customer with a mobile device of a retail store may purchase products via his or her mobile device.

With regard to FIG. 1, a network environment 100 may include a retailer 102 that operates a point-of-sale (POS) 104, such as a cash register or other point-of-sale system, to enable customers to purchase goods and/or services ("products") that are being sold by the retailer 102. The POS 104 may be a cash register with a transceiver that is incorporated into the cash register or separate from and in communication with the cash register. In addition, the POS 104 includes a cash register and any peripherals with which the cash register is in communication. In one embodiment, the POS 104 may be configured to enable a customer 106 who has a mobile device 108 that is configured to assist in a financial transaction from the POS 104 to purchase products without the use of a payment card, cash, or other form of payment.

In performing a financial transaction, the POS 104 may communicate with the mobile device 108 of the customer 106. In one embodiment, the POS 104 may communicate a request (not shown) to the mobile device 108 that requires the customer 106 to actively respond in providing permission for the POS 104 to communicate with the mobile device 108. In one embodiment, the mobile device 108 may be configured with an applet (not shown) that monitors for permission requests from the POS 104 and provides a graphical user interface (GUI) on the mobile device 108 that enables the customer to actively allow the POS 104 to communicate with the mobile device 108. By enabling the customer 106 to actively allow the POS 104 to communicate with the mobile device 108, the customer 106 is provided with a sense of comfort in that the mobile device 108 cannot be communicated with by the POS 104 without the customer 106 knowing so. In one embodiment, the customer may be requested for a password or other unique identifier (e.g., fingerprint) to accept the permission request for payment communications to continue.

In response to the customer 106 actively responding to a permission request by the POS 104 via the mobile device 108, the POS 104 may communicate an authorization request 110 that may include a store identifier (ID), POS ID, and transaction amount. The store ID may identify a store, possibly a store of a retail chain, in which the authorization request is being made. The POS ID identifies a specific POS from among multiple POS' in the retail store. The POS ID may be a network identifier, such as a MAC address, of the POS. Rather than communicating the store ID and POS ID, the two IDs may be combined into a single ID or the POS ID may be communicated, which for the purposes of this description, is equivalent to both the store ID and POS ID being communicated. The transaction amount is the amount of money that the total of the products being purchased cost the customer 106.

In response to the authorization request from the POS 104, the mobile device 108 may communicate the authorization request along with a mobile ID (e.g., telephone number) to a telecommunications service provider 112 of the customer 106. The telecommunications service provider 112 may provide telecommunications services that enable the customer 106 to utilize the mobile device 108, as understood in the art. As a customer of the telecommunications service provider 112, the customer is deemed a subscriber of the telecommunications service provider 112. The telecommunications service provider 112, may, in response to receiving the authorization request from the mobile device 108, determine a customer ID of the customer 106 of a bank or financial institution from among multiple possible banks and financial institutions 114 with which the customer 106 has a financial arrangement. The banks and financial institutions 114 may be a typical bank, credit card company, prepaid card company, or any other financial institution (each a "Financial Institution"), as understood in the art. The telecommunications service provider 112 may communicate information 116 that may include the customer ID, store ID, POS ID, and transaction amount to the bank or financial institution of the customer 106 for processing. In response, the financial institution may determine whether the customer 106 has the financial means to cover the purchase being made by the customer 106 at the POS 104. If so, an approval number 118, which may be an alphanumeric identifier, may be communicated back to the telecommunications service provider 112 for communication to an epay system 114. The epay system 114 may operate as a typical epay system, as understood in the art, and, in response to receiving the approval number 118 along with the store ID and POS ID, may communicate that information 120 to the POS 104 to enable the POS 104 to authorize the transaction and complete processing of the transaction. The POS 104, in response to the transaction authorization 122, may generate a receipt 124 for the customer 106, as understood in the art.

As shown in FIG. 1, no account numbers of the customer are communicated within the retailer 102 with the POS 104. In fact, in one embodiment, the only time an account number is actually accessed is at the financial institution. The telecommunications service provider 112 may associate a customer number with the mobile device ID (e.g., telephone ID or telephone number), thereby enabling the financial institution to use the customer ID from the telecommunications service provider 112 to look-up an account number associated with that customer ID so that the account number is not communicated within the retailer 102.

Figure 2:
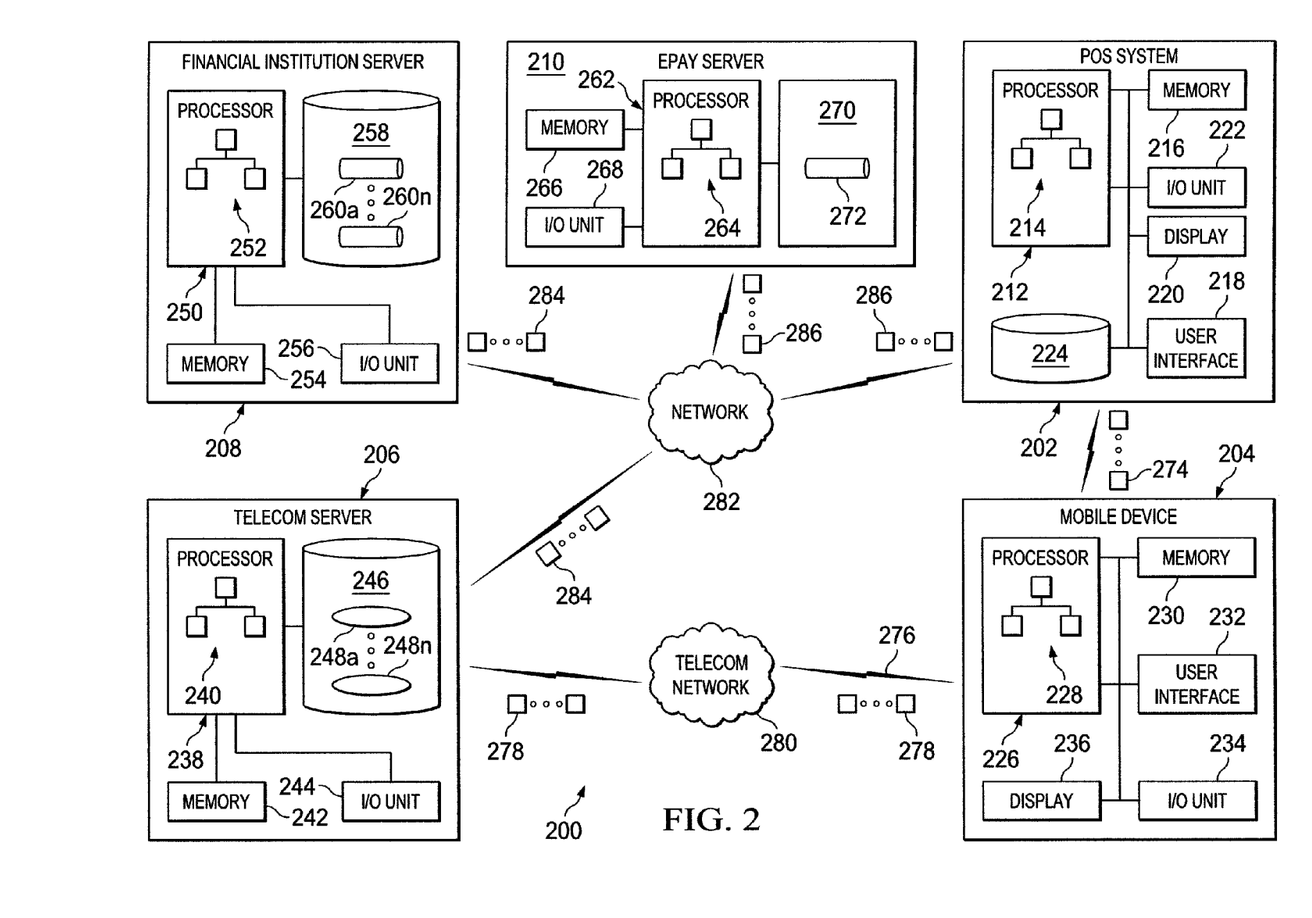
FIG. 2 is a block diagram of an illustrative network environment in which a point-of-sale system may perform a financial transaction using a mobile device of a customer.

With regard to FIG. 2, an illustrative network environment 200 is shown to include a POS 202, mobile device 204, telecommunications server 206, financial institution server 208, and epay server 210. These device and systems 202-210 may be utilized to process a transaction for a customer using the mobile device 204 without the customer having to provide an account number at the retailer through use of a payment card.

The POS 202 may include a processing unit 212 that executes software 214. The software 214 may be configured to cause the processing unit 212 to perform a financial transaction, including (i) accumulating a total amount due for purchases of products within a retail store, and (ii) communicating with the mobile device 204 of a customer for payment of the products by the customer, as further described herein. The POS 202 may include a memory 216, user interface 218, and display 220 with which the processing unit 212 is in communication. The processing unit 212 may further be in communication with an input/output (I/O) unit 222 and storage unit 224. The memory 216 may be configured to store data and software to enable the POS system 202 to process financial transactions, such as the purchase of products in the retail store. The user interface 218 may include keys or hard-buttons that enables a cash register attendant or user to interface with the POS 202 in handling financial transactions. The display 220 may be an electronic display. In one embodiment, the display 220 may be a touch-screen display that enables a cash register attendant or user to touch the screen as opposed to using a keyboard or other user interface device, as understood in the art. The I/O unit 222 may be configured to communicate over a broadband communications network, such as the Internet, either directly or indirectly via a retail store local area network, with which the POS is hardwired and communicate locally with the mobile device 204 using a wireless communications protocol. In one embodiment, the wireless communications protocol is the Bluetooth®, Wi-Fi, or any other local wireless communications protocol, as understood in the art. The storage unit 224 may be configured to store transaction information of which the POS 202 collects throughout a day, week, month, or any other time period. The storage unit 224 may further be configured to store current pricing of products in the store that the POS 202 may scan or otherwise checkout when customers are making purchases of products in the retail store.

The mobile device 204 may be configured with a processing unit 226 that executes software 228. The software 228 may be configured to cause the processing unit 226 to perform conventional telecommunications operations, including telephone calls, text messaging, photographs, or any other conventional mobile device process, as understood in the art. The software 214 may further be configured to enable a user of the mobile device 204 to perform financial transactions in cooperation with a POS in a retail store or elsewhere, as further described herein. The processing unit 226 may be in communication with a memory 230, user interface 232, I/O unit 234, and display 236. The memory 230 may be configured to store data and software to enable the mobile device 204 to perform traditional functionality and financial transactions, as described herein. The user interface 232 may be a keyboard or other device that enables the user to interface with the mobile device 204. The I/O unit 234 may be configured to communicate with a telecommunications system, such as mobile telephone network, and perform local communications, such as using Bluetooth® or any other communications protocol to communicate with a POS. A display 236, which may be a touch-screen display or non-touch-screen display that enables a user to interface with the mobile device 204, may also be in communication with the processing unit 226.

The telecommunications server 206 may include a processing unit 238 that executes software 240. The software 240 may be configured to provide for conventional telecommunications services, as understood in the art, and also assist in performing financial transactions via the mobile device 204, as further described herein. The processing unit 238 may further be in communication with a memory 242 that is configured to store data and software, I/O unit 244 that is configured to communicate over one or more communications networks, and storage unit 246 that is configured to store one or more data repositories 248a-248n (collectively 248). The data repositories 248 may be configured to store information associated with each mobile device of each subscriber of the telecommunications service provider. In addition, the data repositories 248 may be configured to store customer ID information as provided by financial institutions and banks with which subscribers of the telecommunications service provider have accounts.

The financial institution server 208 may include a processing unit 250 that executes software 252. The software 252 may be configured to perform conventional financial institution processing, as understood in the art, in addition to providing for financial transactions via mobile devices, as described herein. The processing unit 250 may be in communication with a memory 254 that is configured to store data and software, I/O unit 256 that is configured to enable the financial institution server 208 to communicate over a communications network, and storage unit 258 that is configured to store one or more data repositories 260a-260n (collectively 260). The data repositories 260 may be configured to store financial information of customers of the financial institution. The account information may include bank accounts, prepaid card accounts, credit card accounts, and any other financial account, as understood in the art. In addition, the data repositories 260 may include a data repository that associates customer numbers with account numbers, thereby enabling the processing unit 250 to receive a customer ID and associate it with an account to process a transaction amount to determine whether or not the account is financially solvent to process the financial transaction.

The epay server 210 may be configured to handle financial transactions by routing financial information to one or more POS systems during a financial transaction. The epay server 210, which typically handles credit card or other payment card transactions, may include a processing unit 262 that executes software 264. The software 264 may be configured to receive and communicate authorization numbers or other financial transaction authorization and decline information to point-of-sale systems for notifying the point-of-sale systems that financial transactions are approved or denied. The epay server 210 may further include a memory

266, I/O unit 268, and storage unit 270 with which the processing unit 262 is in communication. The storage unit 270 may include a data repository 272 to record communications that pass through the epay server 210.

In operation, when a customer is making a purchase of products at the POS 202, the POS may be selectably engaged to communicate with the mobile device 204 using a local wireless communications protocol. The local wireless communications protocol may utilize data packets 274 for communicating transaction information, such as store ID, POS ID, and transaction amount, to the mobile device 204. In one embodiment, the data packets 274 may allow for the POS 202 to request access to the mobile device 204 prior to communicating transaction information. The mobile device 204, in response to receiving a request for access, may prompt a user with a graphical user interface or other graphical user interface element to actively allow the POS 202 to communicate with the mobile device 204. In response to the mobile device 204 receiving a payment request that includes financial transaction information, the mobile device 204 may communicate the financial transaction information along with a mobile device identifier via a wireless communications interface 276 using data packets 278. It should be understood that an application embodied in the software 228 may be executed to cause the mobile device 204 to perform the functional operation described herein. The wireless communications interface 276 may be with a telecommunications network 280, such as a mobile telephone network, which, routes the data packets 278 to the telecommunications server 206.

The telecommunications server 206, in receiving the payment request from the mobile device 204, may look-up a customer ID of a subscriber of the mobile device 204 and communicate the customer ID along with other transaction information via communications network 282, such as the Internet, using data packets 284 to the financial institution server 208. The financial institution server 208, in response to receiving the customer ID and financial transaction information, may look-up an account number and current balance of the account associated with the customer ID, and determine whether the customer has an available balance in order to process the current financial transaction. If so, then the financial institution server 208 may communicate an approval number to the telecommunications server 206 or directly to the epay server 210. If communicated to the telecommunications server 206, then the telecommunications server 206 may route the approval number or denial notification to the epay server 210, which, in turn, routes the approval number to the POS 202 via communications network 282 using data packets 286. The approval number or denial notification may be received by the POS system 202, which allows for completion of the financial transaction for the customer.

Figure 3:
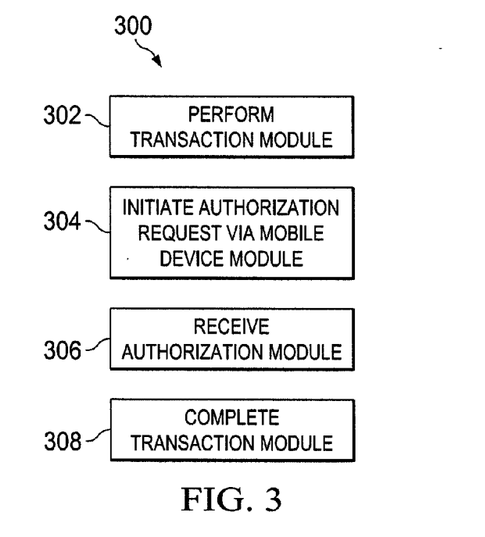
FIG. 3 is a block diagram of illustrative modules of a point-of-sale system for use in performing financial transactions via a mobile device of a customer.

With regard to FIG. 3, a block diagram of illustrative modules that may be executed on a POS is shown. The modules 300 may include a perform transaction module 302 that is configured to enable a cashier or customer to use the POS to perform a transaction for purchasing goods and/or services. In performing the transaction, the perform transaction module 302 may tally a total purchase or transaction amount. Upon requesting payment for the transaction, the cashier or user may select to initiate an authorization request via a mobile device (e.g., mobile telephone) of the customer as opposed to using a credit card or cash to pay for the transaction. An initiate authorization request via mobile device module 304 may be configured to initiate a permission request from a user of the mobile device. In one embodiment, the permission request may require the user to actively allow permission of the POS to communicate with the mobile device. In response to receiving permission, the module 304 may communicate an authorization request via the mobile device for the transaction amount. The authorization or transaction request may include a store identifier, POS identifier, and transaction amount that is communicated to the mobile device for communication ultimately to a bank or other financial institution of the customer. In one embodiment, the modules 300 may be configured to prevent any communications from the mobile device other than permission to all the POS to communicate with the mobile device and other synchronization communication so as to minimize any potential hacking from an unauthorized user.

A receive authorization module 306 may be configured to receive authorization for the financial transaction from an epay system, as understood in the art, in response to the authorization request sent by the POS via the mobile telephone to a bank or financial institution of the customer. The receive authorization module 306 may be in communication with the perform transaction module 302, which, in response to receiving the authorization in the form of an authorization number, for example, may communicate with a complete transaction module 308, which completes the financial transaction by printing or otherwise generating a receipt of the transaction for the customer.

Figure 4:
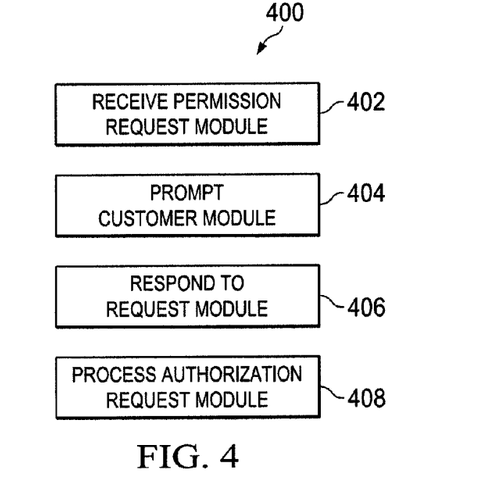
FIG. 4 is a block diagram of illustrative modules that may be executed on a mobile device to enable a POS to perform a financial transaction via the mobile device.

With regard to FIG. 4, a block diagram of illustrative software modules 400 that may be executed on a mobile device. The modules 400 may include a receive permission request module 402 that is configured to receive a permission request from a POS to initiate communications with the mobile device. A prompt customer module 404 may be configured to, in response to receiving a permission request, display a graphical user interface or element which notifies the user or customer to actively accept the permission request. In one embodiment, the prompt customer module 404 may request a simple "accept" or "decline" from the user. Alternatively, the prompt customer module 404 may request a password or other unique identifier (e.g., fingerprint) from the customer to accept the permission request. The prompt customer module 404, in response to the user accepting the permission request, may further prompt the user of the mobile device to select a financial institution (e.g., Visa®, Mastercard®, Bank of America®), account type (e.g., debit or credit) for payment of the transaction, and/or account number (e.g., showing the last four digits of an account for selection thereof). Alternatively, a default financial institution and/or account type may be preselected by the user by using a graphical user interface on the mobile device as provided by an application being executed on the mobile device or via a graphical user interface provided by a communications carrier of the user. In an alternative embodiment, a user of the mobile device may launch an application or applet that enables communication from the POS, which allows the receive permission request module 402 to automatically be activated in response to the user selecting the application to communicate with the POS.

Figure 8A:
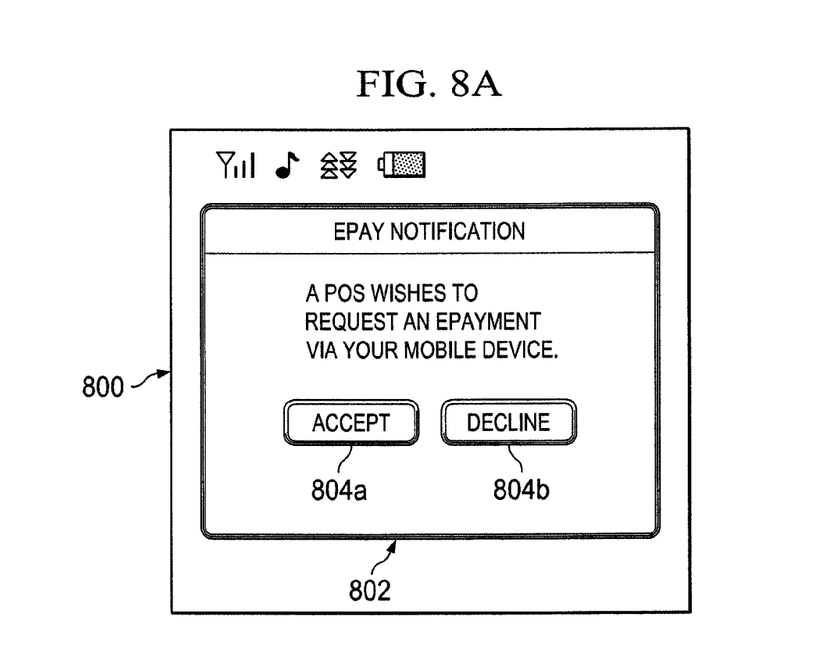
FIGS. 8A and 8B are screen shots of illustrative graphical user interfaces on a mobile device that enable a user to accept an epay request and select a payment method.
Figure 8B:
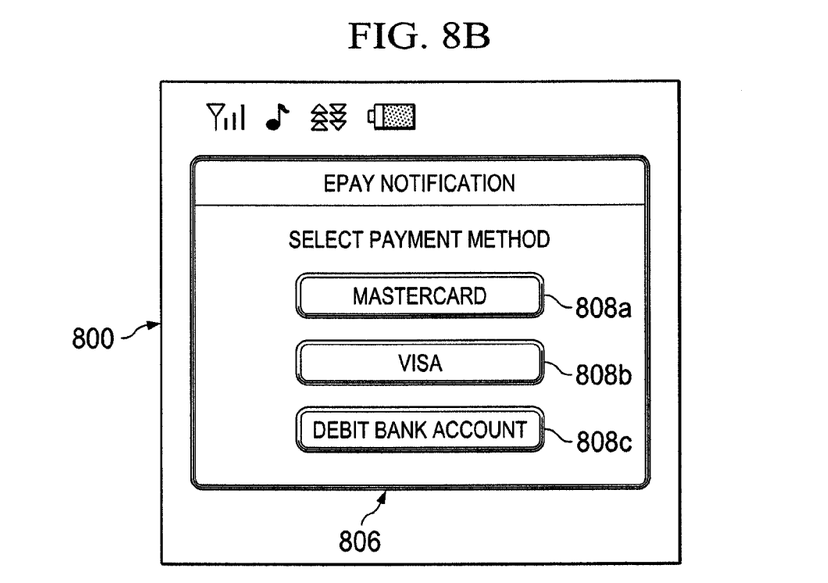

With regard to FIGS. 8A and 8B, an electronic displays 800 showing screen shots of illustrative graphical user interfaces 802 and 806 on a mobile device that enable a user to accept an epay request and select a payment method, respectively, are shown. The epay request may enable a user to select "ACCEPT" or "DECLINE" selection option soft-buttons 804a or 804b, respectively, to accept an epay transaction via the mobile device, as further described herein. Although not shown, the graphical user interface may further prompt the user to enter a password or other unique identifier (e.g., fingerprint) to enable the user to select the "ACCEPT" selection option. In one embodiment, in response to the user selecting the "ACCEPT" selection option soft-button 804a, the user may be prompted to select a payment method. The selectable payment methods may be previously established by the user based on his or her available payment methods. As shown, "MASTERCARD," "VISA," AND "DEBIT BANK ACCOUNT" selection option soft-buttons 808a, 808b, and 808c are available for selection. Based on the payment method selection, the mobile device communications communicates the transaction information to the appropriate network address of the selected financial institution (e.g., Mastercard, Visa, or debit bank). In an alternative embodiment, the network of the selected financial institution may be communicated back to the POS along with the acceptance message for inclusion with the transaction information that is to be sent to the mobile device. If the user has only a single payment method, has a, default payment selected, or established the payment method with his or her mobile device carrier, then the mobile device may not prompt the user to select a payment method and will communicate the transaction information to the default financial institution.

Continuing with FIG. 4, a respond to a request module 406 may be configured to communicate the response by the user back to the POS. In one embodiment, rather than communicating back to the POS, if the POS has already communicated transaction information to the mobile device, then the respond to a request module 406 may communicate with a process authorization request module 408 to automatically communicate the transaction information, such as store ID, POS ID, and transaction amount, to the communications carrier of the customer. More specifically, the process authorization request module 408 may be configured to process the authorization request by creating data packets that include the transaction information that was received and communicate the transaction information in the data packets to the communications carrier or service provider of which the customer is a subscriber.

Figure 5:
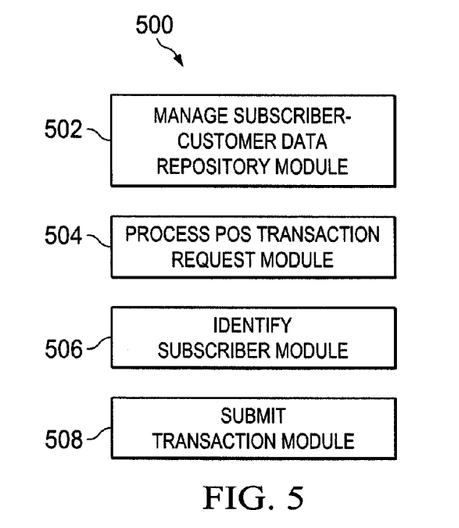
FIG. 5 is a block diagram of illustrative modules that may be executed on a telecommunications server for performing a financial transaction by a POS via a mobile device.

With regard to FIG. 5, a block diagram of modules 500 that may be executed on a telecommunications service provider server are shown. The modules 500 may include a manage subscriber-customer data repository module 502 that is configured to manage a list of subscriber data of the communications service provider and customer data of a financial institution with which the subscriber has an account. In other words, the list or table may include subscriber identifiers (e.g., telephone numbers) and have associated customer identifiers (e.g., customer numbers assigned by a bank) that allows the telecommunications service provider server to look-up a customer identifier of the bank or financial institution. That customer identifier may be communicated to the bank or financial institution for looking-up an account associated with the subscriber, which is a customer of a retailer at that point in time making a purchase at a POS. TABLE I below shows an example list of subscriber information and customer information that allows for the telecommunications server to look-up a customer ID for sending to a financial institution.

TABLE I

| Phone Number | Customer ID | Financial Institution Name | Financial Institution Server Address |
|---|---|---|---|
| 214-555-1234 | 123456 | Chase Bank | 135.641.8-21 |
| 214-555-3456 | 234567 | Wells Fargo | 137.27.583.12 |
| . . . | . . . | . . . | . . . |

A process POS transaction request module 504 may be configured to process a transaction request from a POS by receiving the transaction information and determining a customer ID, as established by a financial institution as associated with a mobile device ID, and communicate the customer ID to the financial institution. In one embodiment, an identify a subscriber module 506, which is configured to identify a subscriber associated with the mobile device by parsing the information communicated to the telecommunications server from the mobile device, may be utilized to identify the mobile device ID associated with the subscriber. A submit transaction module 508 may be configured to submit the customer ID along with the transaction information (e.g., transaction amount) to the financial institution server.

Figure 6:
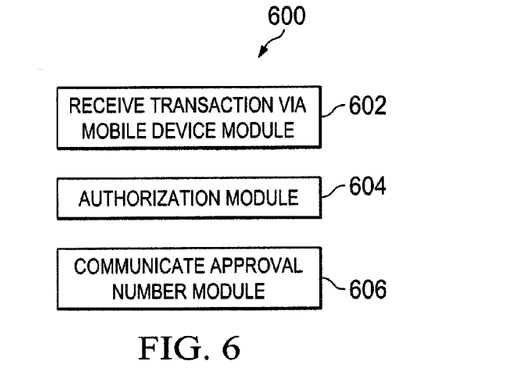
FIG. 6 is a block diagram of illustrative modules that may be executed on a financial institution server for performing a financial transaction by a POS via a mobile device.

With regard to FIG. 6, a block diagram of illustrative modules 600 that may be executed on a financial institution server are shown. The modules 600 may include a receive transaction via mobile device module 602 that is configured to receive a transaction request from the telecommunications server that includes a customer ID of a financial institution customer and transaction amount, for example. An authorization module 604 may be configured to evaluate the account associated with the customer ID to determine whether or not the account is financially solvent enough for allowing the transaction to occur (e.g., verifying that there is enough money in a bank account or enough credit limit of a credit account exists). If the authorization module 604 determines that the account associated with the customer ID is financially solvent enough for allowing for the transaction to proceed, then the authorization module 604 may notify a communicate approval number module 606 to communicate an approval number from the financial institution server back to the telecommunications server or directly to an epay server. It should be understood that the authorization module 604 may generate an authorization number, which may be an alphanumeric value, that authorizes the transaction at the POS to proceed. If the account is not financially solvent, then a denial notification may be generated and communicated back to the telecommunications server or directly to the epay server.

Figure 7:
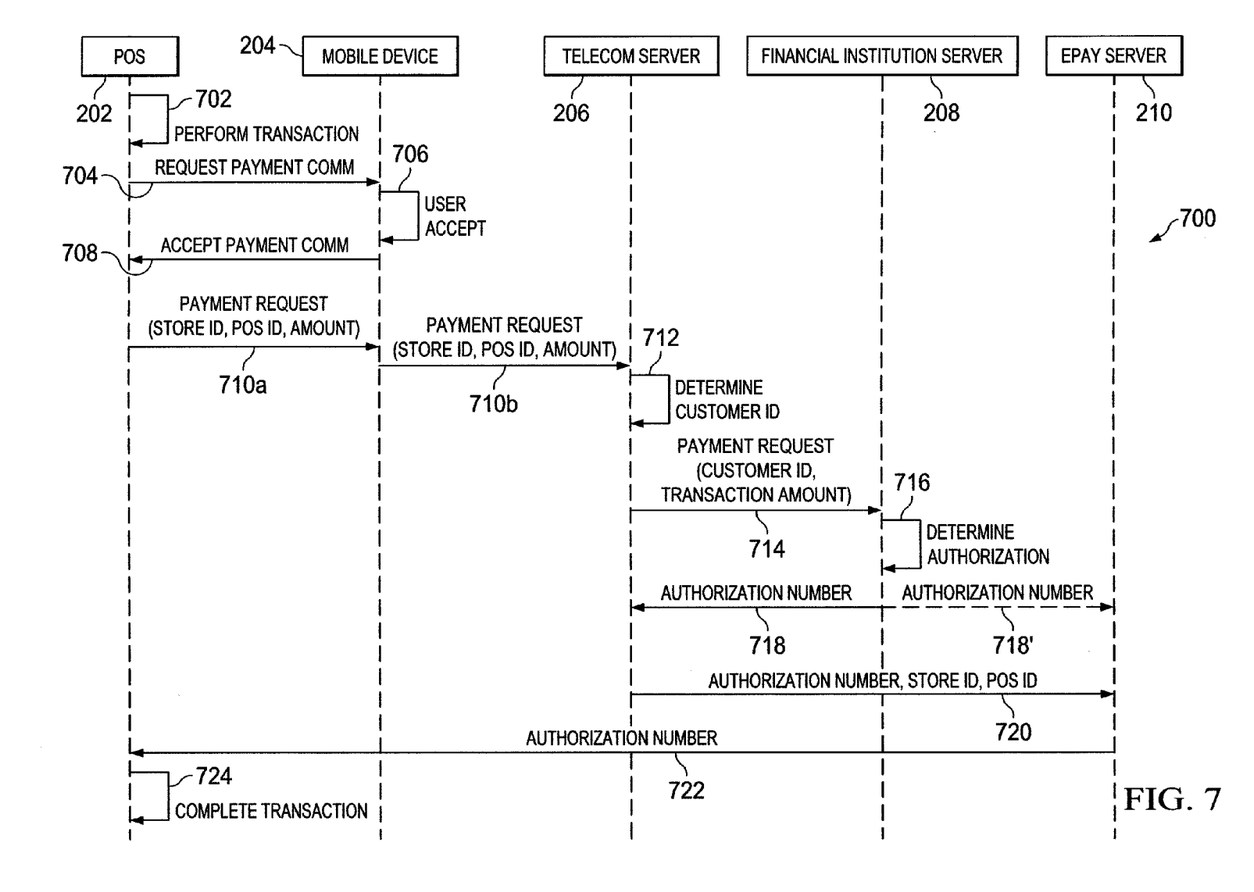
FIG. 7 is a timing diagram showing communications between different devices and systems for enabling a retailer to perform a financial transaction for a customer by a POS via a customer's mobile device.

With regard to FIG. 7, a number of systems and devices are shown to match those of FIG. 2, including the POS 202, mobile device 204, telecommunications server 206, financial institution server 208, and epay server 210. The systems and devices 202-210 may be utilized to perform a financial transaction process 700 within or outside of a retail environment. At step 702, a financial transaction may be performed, where the financial transaction may include purchasing of products by a customer of a retailer. It should be understood that the POS 202 may include any other type of point-of-sale, including a self-checkout system, home communications system (e.g., computer, gaming system, television) to perform an online purchase, or any other purchase environment, as understood in the art. At step 704, a request payment communication may be communicated from the POS 202 to the mobile device 204. The request payment communication may simply request payment and/or communication acceptance from a customer using the mobile device 204 to allow the POS to have communications with the mobile device 204. At step 706, the user of the mobile device 204 may accept the request and, in response to accepting the request at step 706, communicate an acceptance to the POS 202 at step 708. In response to receiving the acceptance at step 708, a payment request, which may include a store ID, POS ID, and transaction amount may be performed at step 710a. It should be understood that steps 704-708 may be optional, but to minimize customer concerns, those steps may be performed.

At step 710b, the mobile device 204 may communicate the payment request to the telecommunications server 206. The telecommunications server 206 may determine a customer ID at step 712, where the customer ID is a customer ID as established by a financial institution and/or the telecommunications service provider that allows the financial institution of a subscriber, which is currently the customer of the retailer, to associate an account with that customer/subscriber. At step 714, a payment request that includes the customer ID and transaction amount may be communicated to the financial institution server 208. If the financial institution server 208 is to communicate directly with the epay server 210 after determining an authorization for the customer at step 716, then the store ID and POS ID may also be communicated to the financial institution server 208. Assuming that the financial institution server 208 is to communicate an authorization number or denial notification of the financial transaction back to the telecommunications server 206, then the process 700 continues at step 718, where the authorization number is communicated back to the telecommunications server 206. Alternatively, the authorization number or denial notification may be communicated at step 718' directly to the epay server 210. At step 720, if the authorization number or denial notification was communicated to the telecommunications server 206, then the telecommunications server 206 may communicate the authorization number, store ID, and POS ID to the epay server 210. Alternative communications may be utilized to provide the epay server 210 with the authorization number or denial notification, store ID, and POS ID. It should be understood that the authorization information may be more limited, such as an approve or denial notification and POS ID, and communicated to the epay server 210. The epay server 210 may route the authorization number to the POS 202 at step 722. In response to receiving the authorization number or denial notification, the POS 202 may complete the transaction at step 724. Still yet, rather than using an epay server 210, direct communications from the financial institution server 208 to the POS 202 may be performed.

The previous detailed description is of a small number of embodiments for implementing the invention and is not intended to be limiting in scope. As an example, rather than the mobile device communicating the transaction information to the communications carrier, the mobile device may provide the POS with a subscriber or mobile device identifier and network address of the communications carrier and the POS may communicate the transaction information along with the subscriber or mobile device identifier and the financial transaction may be completed as further described herein. One of skill in this art will immediately envisage the methods and variations used to implement this invention in other areas than those described in detail. The following claims set forth a number of the embodiments of the invention disclosed with greater particularity.

What is claimed:

1. A point-of-sale (POS) system for performing financial transactions using a mobile device, the POS system comprising:
    a processing unit at the POS system configured to enable processing of a purchase transaction for at least one product for purchase by a customer; and
    a wireless interface in communication with the processing unit, and configured to:
        enable the processing unit to enter into one-to-one communications with the mobile device being utilized by the customer, and
        prevent the POS system from receiving communications from the mobile device other than an acceptance message to allow for the processing unit to communicate via the mobile device to route a store identifier, a POS identifier, and a transaction amount to a financial institution of the customer for approval of the transaction amount for the customer;
    wherein the processing unit is further configured to:
        wirelessly transmit the store identifier, the POS identifier, and the transaction amount to the mobile device via the wireless interface, and complete the purchase transaction in response to receiving an approval number based on the store identifier, the POS identifier, and the transaction amount from a financial institution server associated with the financial institution of the customer.

2. The POS system according to claim 1, wherein receiving the approval number includes receiving the approval number via a different communications path than the wireless interface.

3. The POS system according to claim 1, wherein the processing unit is further configured to communicate a request via the wireless interface to the mobile device to enable the customer to accept communications from the processing unit.

4. The POS system according to claim 3, wherein, in response to receiving an acceptance from the mobile device, the processing unit is further configured to communicate the store identifier, the POS identifier, and the transaction amount to the mobile device.

5. The POS system according to claim 1, wherein the mobile device, in response to receiving the store identifier, POS identifier, and transaction amount, is configured to communicate to the financial institution server.

6. The POS system according to claim 1, wherein the processing unit, in communicating the store identifier, the POS identifier, and the transaction amount to the financial institution server, causes the mobile device to communicate the store identifier, the POS identifier, and the transaction amount to the financial institution server to determine and communicate the approval number to the POS system for completing the purchase transaction.

7. A method for controlling wireless communications between a mobile device and a point-of-sale system in a commerce environment to facilitate a financial transaction, the method comprising:
    processing a purchase transaction at a point-of-sale (POS) system for at least one product for purchase by a customer;
    entering into one-to-one communications with the mobile device;
    wirelessly transmitting, via a communication network, to the mobile device of the customer a store identifier, a POS identifier, and a transaction amount, the communication network configured to prevent the POS system from receiving communications from the mobile device;
    preventing the mobile device from communicating information other than an acceptance message to allow for communicating to the mobile device to route the store identifier, the POS identifier, and the transaction amount to the financial institution of the customer for approval of the transaction amount for the customer; and in response to receiving an approval number based on the store identifier, the POS identifier, and the transaction amount for the purchase transaction from a financial institution server associated with a financial institution of the customer, completing the purchase transaction at the POS system.

8. The method according to claim 7, wherein receiving the approval number is via a different communications path from a communications path with the mobile device.

9. The method according to claim 7, further comprising communicating a request to the mobile device to enable the customer to accept communications.

10. The method according to claim 9, further comprising, in response to receiving an acceptance to the request from the mobile device, communicating the store identifier, the POS identifier, and the transaction amount to the mobile device.

11. A method for controlling wireless communications between a mobile device and a point-of-sale system in a commerce environment to facilitate a financial transaction, the method comprising:
   determining at a point-of-sale (POS) system a transaction amount for a purchase of at least one product by a customer;
   wirelessly receiving an acceptance message at the POS system from a mobile device to permit the POS system to selectively engage in communications with the mobile device;
   in response to receiving the acceptance message, entering into one-to-one communications with the mobile device and wirelessly transmitting a store identifier, a POS identifier, and a transaction amount from the POS system to the mobile device of the customer; and
   completing the transaction for the at least one product in response to receiving an approval number from a financial institution server associated with the customer, wherein the approval number is based on the store identifier, the POS identifier, and the transaction amount transmitted to the mobile, and wherein the transaction is completed without the mobile device transmitting any account information associated with the customer to the POS system.

12. The method according to claim 11, wherein wirelessly transmitting to the mobile device includes transmitting the store identifier, the POS identifier, and the transaction amount to the mobile device.

13. The method according to claim 12, further comprising:
   the mobile device communicating the store identifier, the POS identifier, and the transaction amount to the financial institution server; and
   in response to receiving the store identifier, the POS identifier, and the transaction amount, the financial institution server wirelessly transmitting the approval number to the POS system associated with the store identifier and the POS identifier.

14. A system for approving a financial transaction using a mobile device comprising:
   a point-of-sale (POS) system selectively engaged in one-to-one communication with the mobile device of a customer, the POS system configured to prevent communications from the mobile device other than an acceptance message;
   a processing unit at a telecommunications service provider server, the processing unit configured to:
      receive a set of data including a mobile device identifier, a store identifier, a point-of-sale (POS) system identifier, and a transaction amount from the mobile device of a customer of a telecommunications service provider, and
      after verification, replace at least the mobile device identifier and the transaction amount in the set of data with an approval token in the set of data and wirelessly transmit the set of data including the approval token to the POS system associated with the POS identifier and the store identifier, wherein the approval token is generated based on the mobile device identifier, the store identifier, the POS identifier, and the transaction amount and serves to approve payment of the transaction amount at the POS system.

15. The system of claim 14, wherein the POS system is configured to provide the store identifier, the POS identifier, and the transaction amount to the customer.

16. The system of claim 14, wherein the POS system is configured to complete a transaction for the customer in response to receiving an approval token from the telecommunications service provider server, wherein the transaction is a purchase of at least one product.

17. The system of claim 14, wherein the POS system is configured to communicate with the mobile device of the customer.

18. The system of claim 17, wherein the POS system is configured to not accept any communications from the mobile device.

19. The system of claim 17, wherein the mobile device is configured to transmit the store identifier, the POS identifier, and the transaction amount to the telecommunications service provider server.

20. The system of claim 17, wherein the mobile device is configured to not transmit any communications to the POS system.

* * * * *